United States Patent
Dai (10) Patent No.: US 10,476,395 B2
(45) Date of Patent: Nov. 12, 2019

(54) VOLTAGE CONVERTING SYSTEM AND METHOD OF USING THE SAME

(71) Applicant: Futurewei Technologies, Inc., Plano, TX (US)

(72) Inventor: Heping Dai, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/827,508

(22) Filed: Nov. 30, 2017

(65) Prior Publication Data

US 2019/0165665 A1    May 30, 2019

(51) Int. Cl.
| | |
|---|---|
| *H02M 3/335* | (2006.01) |
| *H02M 1/084* | (2006.01) |
| *H02J 9/06* | (2006.01) |
| *H02M 7/5387* | (2007.01) |
| *H02M 1/00* | (2006.01) |

(52) U.S. Cl.
CPC ......... *H02M 3/33507* (2013.01); *H02J 9/062* (2013.01); *H02M 1/0845* (2013.01); *H02M 3/33592* (2013.01); *H02M 7/53871* (2013.01); *H02M 2001/0022* (2013.01)

(58) Field of Classification Search
CPC ............. H02J 9/062; H02M 2001/007; H02M 2001/0083; H02M 2001/0022; H02M 2007/4813
See application file for complete search history.

(56) References Cited

U.S. PATENT DOCUMENTS

| | | | | |
|---|---|---|---|---|
| 5,570,276 A | * | 10/1996 | Cuk | H02M 3/005 323/266 |
| 6,400,582 B1 | * | 6/2002 | Hemena | H02M 3/285 363/131 |
| 7,272,021 B2 | | 9/2007 | Schlecht et al. | |
| 8,410,889 B2 | * | 4/2013 | Garrity | H01F 27/2847 336/172 |
| 8,488,340 B2 | * | 7/2013 | Zhang | H02M 1/4225 363/21.07 |
| 8,681,513 B2 | * | 3/2014 | Reddy | H02M 7/217 323/266 |
| 9,461,554 B2 | * | 10/2016 | Fu | H02M 3/1582 |
| 9,548,668 B2 | * | 1/2017 | Fu | H02M 3/33569 |
| 9,906,128 B2 | * | 2/2018 | Tschirhart | H02M 3/158 |

(Continued)

FOREIGN PATENT DOCUMENTS

| | | |
|---|---|---|
| CN | 202424533 U | 9/2012 |
| CN | 103780099 A | 5/2014 |

(Continued)

*Primary Examiner* — Yusef A Ahmed
(74) *Attorney, Agent, or Firm* — Slater Matsil, LLP (57) ABSTRACT

Aspects of the disclosure provide a voltage converting system. The voltage converting system includes a first power converter configured to convert an input voltage to an intermediate voltage, a second power converter configured to convert the intermediate voltage to an output voltage at a target voltage level, and a control circuit coupled to the first power converter and the second power converter. The control circuit is configured to, upon detection of the input voltage having a voltage level that is within a first range, perform a close-loop control of the second power converter to output the output voltage at the target voltage level.

10 Claims, 9 Drawing Sheets

(56) References Cited

U.S. PATENT DOCUMENTS

| | | | | |
|---|---|---|---|---|
| 2003/0137853 A1* | 7/2003 | Zaitsu | H02M 3/33592 | 363/25 |
| 2008/0285313 A1* | 11/2008 | Oettinger | H02M 3/157 | 363/26 |
| 2009/0122578 A1* | 5/2009 | Beltran | H02M 3/33507 | 363/16 |
| 2010/0102793 A1* | 4/2010 | Dishman | G06F 1/26 | 323/305 |
| 2010/0157638 A1* | 6/2010 | Naiknaware | H02M 7/4807 | 363/131 |
| 2010/0289467 A1 | 11/2010 | Wu et al. | | |
| 2011/0292688 A1* | 12/2011 | Zhang | H02M 1/32 | 363/21.02 |
| 2012/0063177 A1* | 3/2012 | Garrity | H02J 3/383 | 363/37 |
| 2012/0080943 A1* | 4/2012 | Phadke | H02J 3/385 | 307/24 |
| 2012/0307535 A1* | 12/2012 | Kim | H02M 3/158 | 363/125 |
| 2013/0003430 A1* | 1/2013 | Reddy | H02M 3/337 | 363/74 |
| 2013/0063981 A1* | 3/2013 | Dujic | H02M 1/4233 | 363/16 |
| 2013/0076143 A1* | 3/2013 | Guo | H02J 9/04 | 307/66 |
| 2015/0263634 A1* | 9/2015 | Fu | H02M 3/33569 | 363/21.02 |
| 2016/0094136 A1* | 3/2016 | Fu | H02M 3/1582 | 363/21.02 |
| 2016/0181933 A1* | 6/2016 | James | B60L 11/1816 | 363/17 |
| 2016/0248343 A1* | 8/2016 | Garrity | H02J 3/383 | |
| 2017/0170734 A1* | 6/2017 | Sheng | H02M 3/33507 | |
| 2017/0280523 A1* | 9/2017 | Kathiresan | H05B 33/0815 | |
| 2018/0076723 A1* | 3/2018 | Li | H02M 3/3378 | |
| 2018/0175732 A1* | 6/2018 | Dai | H02M 3/1582 | |
| 2018/0205315 A1* | 7/2018 | Giuliano | H02M 3/07 | |
| 2018/0294672 A1* | 10/2018 | Zhong | H02J 7/025 | |
| 2018/0294732 A1* | 10/2018 | Ye | H02M 3/33546 | |
| 2018/0351451 A1* | 12/2018 | Giuliano | H02M 3/07 | |

FOREIGN PATENT DOCUMENTS

| | | |
|---|---|---|
| CN | 104539146 A | 4/2015 |
| CN | 106849302 A | 6/2017 |

* cited by examiner

VOLTAGE CONVERTING SYSTEM AND METHOD OF USING THE SAME

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In many applications, a voltage converting system includes two or more stages of power converters to convert an input voltage having a voltage level within a wide voltage range to a regulated output voltage at a target voltage level. The overall power conversion efficiency of the voltage converting system and the accuracy of the output voltage may be determined based on the configurations of the power converters and how the power converters are being controlled.

SUMMARY

According to aspects of the present disclosure, there is provided a voltage converting system. The voltage converting system can include a first power converter configured to convert an input voltage to an intermediate voltage, a second power converter configured to convert the intermediate voltage to an output voltage at a target voltage level, and a control circuit coupled to the first power converter and the second power converter. The control circuit can be configured to, upon detection of the input voltage having a voltage level that is within a first range, perform a close-loop control of the second power converter to output the output voltage at the target voltage level. In some embodiments, upon detection of the voltage level of the input voltage being within a second range, that is outside the first range, the control circuit can perform an open-loop control of the second power converter to output the output voltage at the target voltage level.

Optionally, the control circuit can be further configured to perform an open-loop control of the first power converter upon the detection of the voltage level of the input voltage being within the first range, and to perform a close-loop control of the first power converter upon the detection of the voltage level of the input voltage being within the second range.

Optionally, in any of the preceding aspects, the control circuit can be configured to perform the close-loop control of the first power converter using the output voltage as a feedback or using the intermediate voltage as a feedback.

Optionally, in any of the preceding aspects, the control circuit for outputting the output voltage at the target voltage level can be further configured to perform a close-loop control of the first power converter upon detection of the voltage level of the input voltage being within a third range that is different form the first and second ranges, and to perform the close-loop control of the second power converter upon the detection of the voltage level of the input voltage being within the third range.

Optionally, in any of the preceding aspects, the second power converter is an isolated direct current (DC) to DC converter that includes an inverter, a rectifier, and a transformer between the inverter and the rectifier. In some embodiments, in any of the preceding aspects, the inverter of the second power converter may include a first half-bridge leg having a first power node configured to receive the intermediate voltage from the first power converter, and a second half-bridge leg having a second power node configured to receive the intermediate voltage from the first power converter. The transformer of the second power converter may include a primary side electrically coupled between output nodes of the first half-bridge leg and the second half-bridge leg.

Optionally, in any of the preceding aspects, the inverter of the second power converter may include a first half-bridge leg having a first power node configured to receive the intermediate voltage from the first power converter, and a second half-bridge leg having a second power node configured to receive the input voltage.

Optionally, in any of the preceding aspects, the first power converter is a buck-boost converter.

Optionally, in any of the preceding aspects, the first power converter, under a close-loop control thereof, is configured to receive the input voltage within a first dynamic range, and the second power converter, under the close-loop control thereof, is configured to receive the intermediate voltage within a second dynamic range. The second dynamic range is greater than the first dynamic range.

According to another aspect of the disclosure, there can be provided a method that includes driving a first power converter of the voltage converting system to convert an input voltage to an intermediate voltage and driving a second power converter of the voltage converting system to convert the intermediate voltage to an output voltage at a target voltage level based on a voltage level of the input voltage. The driving the second power converter may include, upon detection of the voltage level of the input voltage being within a first range, performing a close-loop control of the second power converter to output the output voltage at the target voltage level. In some embodiments, upon detection of the voltage level of the input voltage being within a second range, that is outside the first range, performing an open-loop control of the second power converter to output the output voltage at the target voltage level.

Optionally, the driving the first power converter includes performing an open-loop control of the first power converter upon detection of the voltage level of the input voltage being within the first range, and performing a close-loop control of the first power converter upon the detection of the voltage level of the input voltage being within the second range.

Optionally, in any of the preceding aspects, the performing the close-loop control of the first power converter can include using the output voltage as a feedback or using the intermediate voltage as a feedback.

Optionally, in any of the preceding aspects, the driving the first power converter includes performing a close-loop control of the first power converter upon detection of the voltage level of the input voltage being within a third range that is different form the first and second ranges, and the driving the second power converter includes performing the close-loop control of the second power converter upon the detection of the voltage level of the input voltage being within the third range.

According to another aspect of the disclosure, there is provided a voltage converting system. The voltage converting system includes a first power converter configured to convert an input voltage to an intermediate voltage, a first controller configured to drive the first power converter, a second power converter configured to convert the intermediate voltage to an output voltage at a target voltage level, and a second controller configured to drive the second power converter. The voltage converting system further includes a voltage detector configured to detect a voltage level of the input voltage and a mode controller. The mode controller may be configured to, upon detection of the voltage level of the input voltage being within a first range, then instruct the first controller to perform an open-loop control of the first power converter and instruct the second controller to perform a close-loop control of the second power converter. In some embodiments, upon detection of the voltage level of the input voltage being within a second range, that is outside the first range, instruct the first controller to perform a close-loop control of the first power converter and instruct the second controller to perform an open-loop control of the second power converter.

Optionally, in any of the preceding aspects, the first controller can be configured to perform the close-loop control of the first power converter using the output voltage as a feedback or using the intermediate voltage as a feedback.

Optionally, in any of the preceding aspects, the second power converter is an isolated direct current (DC) to DC converter.

Optionally, in any of the preceding aspects, the first power converter is a buck-boost converter.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

In accordance with embodiments of the disclosure, a voltage converting system includes a first power converter that converts an input voltage to an intermediate voltage and a second power converter that converts the intermediate voltage to an output voltage. The voltage converting system can further include a control circuit that can perform a close-loop control of the second power converter if a voltage level of the input voltage is within a first range, and perform an open-loop control of the second power converter if the voltage level of the input voltage is within a second range. Also, in some examples, the control circuit can further perform an open-loop control of the first power converter if the voltage level of the input voltage is within the first range and perform a close-loop control of the first power converter if the voltage level of the input voltage is within the second range. Accordingly, in some applications, the first and second power converters may be driven by balancing the precision of the output voltage and the overall power conversion efficiency of the voltage converting system based on at least the voltage level of the input voltage for a given target voltage level of the output voltage.

In some examples, a voltage converting system can be a set of hardware components embedded in a power converter or a power supply. In some examples, multiple stages of the voltage converting system can be disposed in the same case, package, chassis, or on the same substrate, package frame, or printed circuit board.

Figure 1:
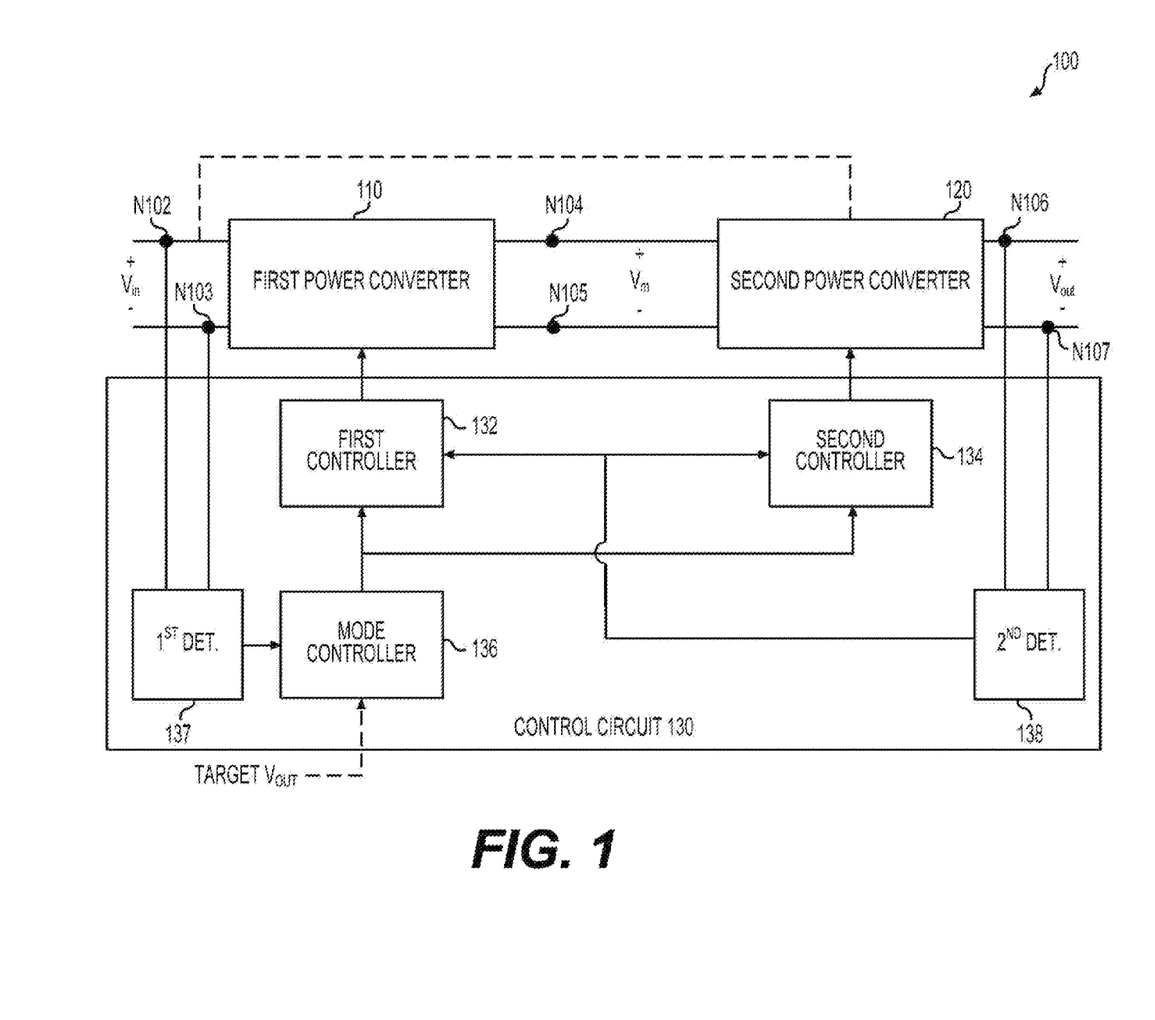
FIG. 1 shows a functional block diagram of an exemplary voltage converting system according to an embodiment of the disclosure.

FIG. 1 shows a functional block diagram of an exemplary voltage converting system 100 according to an embodiment of the disclosure that can receive an input voltage Vin and output an output voltage Vout at a target voltage level. As shown, the voltage converting system 100 includes a first power converter 110, a second power converter 120, and control circuit 130 coupled to the first power converter 110 and the second power converter 120. The first power converter 110 receives the input voltage Vin at a power node N102 with respect to a reference node N103. The first power converter 110 also outputs an intermediate voltage Vm at a power node N104 with respect to a reference node N105. Moreover, the second power converter 120 receives the intermediate voltage Vm at the power node N104 with respect to the reference node N105. The second power converter 120 also outputs the output voltage Vout at a power node N106 with respect to a reference node N107. In some examples, the second power converter 120 may also receive the input voltage Vin and generate the output voltage Vout by converting both the input voltage Vin and the intermediate voltage Vm.

The control circuit 130 is coupled to the first power converter 110 and the second power converter 120 and configured to control the operations of the first power converter 110 and the second power converter 120. In some examples, the control circuit 130 can drive the first power converter 110 to convert the input voltage Vin to the intermediate voltage Vm, and can drive the second power converter 120 to convert the intermediate voltage Vm and/or the input voltage Vin to the output voltage Vout. The control circuit 130 can perform either an open-loop control or a close-loop control of the first power converter 110, and can perform either an open-loop control or a close-loop control of the second power converter 120.

In some examples, the first power converter 110, under the close-loop control thereof, can be configured to receive the input voltage Vin within a first dynamic range; and the second power converter 120, under the close-loop control thereof, can be configured to receive the intermediate voltage Vm within a second dynamic range, where the second dynamic range is greater than the first dynamic range.

The control circuit 130 can include a first controller 132, a second controller 134, a mode controller 136, a first voltage detector 137, and a second voltage detector 138. The first controller 132 can drive the first power converter 110 by, in some examples, performing an open-loop control or a close-loop control of the first power converter 110. Also, the second controller 134 can drive the second power converter 120 by, in some examples, performing an open-loop control or a close-loop control of the second power converter 120. The mode controller 136 can instruct the first controller 132 and/or the second controller 134 with respect to whether to perform an open-loop control or a close-loop control.

As shown in the exemplary embodiment, the first voltage detector 137 is coupled with nodes N102 and N103 and can determine a voltage level of the input voltage Vin, which can be used to determine whether to perform a close-loop control or an open-loop control of the first power converter 110, or used to determine whether to perform a close-loop control or an open-loop control of the second power converter 120. The second voltage detector 138 is coupled with nodes N106 and N107 and can determine a voltage level of the output voltage Vout, which can be used for performing the close-loop control of the first power converter 110 or for performing the close-loop control of the second power converter 120.

The mode controller 136 can receive information regarding the voltage level of the input voltage Vin from the first voltage detector 137. In some examples, the mode controller 136 can instruct the first controller 132 and/or the second controller 134 based on at least the voltage level of the input voltage Vin and/or a target voltage level of the output voltage Vout. The target voltage level of the output voltage Vout may be stored or hardwired in the control circuit 130 or can be received by the mode controller 136 from a source outside the control circuit 130 (e.g., receiving "Target Vout" in FIG. 1).

The mode controller 136 can determine whether to instruct the second controller 134 to perform the open-loop or close-loop control of the second power converter 120 based on the voltage level of the input voltage Vin. For example, given the target voltage level of the output voltage Vout, the mode controller 136 can instruct the second controller 134 to perform the close-loop control of the second power converter 120 if the voltage level of the input voltage Vin is within a first range, and to perform the open-loop control of the second power converter 120 if the voltage level of the input voltage Vin is within a second range different from the first range.

The mode controller 136 can also determine whether to instruct the first controller 132 to perform the open-loop or close-loop control of the first power converter 110 based on the voltage level of the input voltage Vin. For example, given the target voltage level of the output voltage Vout, the mode controller 136 can instruct the first controller 132 to perform the open-loop control of the first power converter 110 if the voltage level of the input voltage Vin is within the first range, and to perform the close-loop control of the first power converter 110 if the voltage level of the input voltage Vin is within the second range.

In yet another example, given the target voltage level of the output voltage Vout, the mode controller 136 can instruct the first controller 132 to perform the close-loop control of the first power converter 110 and instruct the second controller 134 to perform the close-loop control of the second power converter 120 if the voltage level of the input voltage Vin is within a third range different from the first and second ranges.

For example, when the voltage converting system 100 is designed to receive the input voltage Vin ranging from 36 Volts (V) to 60 V and output the output voltage Vout at a target voltage level of 12 V, the first power convert 110 may be designed to receive the input voltage Vin ranging from 36 V to 60 V and to convert the input voltage Vin to the intermediate voltage Vm at 48 V under the close-loop control. Also, the second power convert 120 may be designed to receive the intermediate voltage Vm ranging from 43 V to 51 V and to convert the intermediate voltage Vm to the output voltage Vout at 12 V under the close-loop control.

In some examples, the mode controller 136 may instruct the first controller 132 to perform the open-loop control of the first power converter 110 and instruct the second controller 134 to perform the close-loop control of the second power converter 120 if the voltage level of the input voltage Vin is within a range from 43 V to 51 V (i.e., the first range). Also, the mode controller 136 may instruct the first controller 132 to perform the close-loop control of the first power converter 110 and instruct the second controller 134 to perform the open-loop control of the second power converter 120 if the voltage level of the input voltage Vin is less than 43 V or greater than 51 V (i.e., the second range).

In other examples, the mode controller 136 may instruct the first controller 132 to perform the open-loop control of the first power converter 110 and instruct the second controller 134 to perform the close-loop control of the second power converter 120 if the voltage level of the input voltage Vin is within a range from 43 V to 51 V (i.e., the first range). The mode controller 136 may instruct the first controller 132 to perform the close-loop control of the first power converter 110 and instruct the second controller 134 to perform the open-loop control of the second power converter 120 if the voltage level of the input voltage Vin is less than 38 V or greater than 54 V (i.e., the second range). Also, the mode controller 136 may instruct the first controller 132 to perform the close-loop control of the first power converter 110 and instruct the second controller 134 to perform the close-loop control of the second power converter 120 if the voltage level of the input voltage Vin is within a range between 38 V and 43 V or a range between 51 V and 54 V (i.e., the third range).

Further, the third range can include two subsets that are greater or smaller than the first range, respectively, and the second range includes two subsets that are greater or smaller than the third range, respectively. In some examples, the second range includes two subsets that are greater or smaller than the first range, respectively.

Of course, the above first, second, and third ranges described in the present disclosure are used as non-limiting examples. The first, second, and/or third ranges can be set based on the electrical characteristics of the first power converter 110 and/or the second power converter 120 in order to maximize the overall power conversion efficiency while ensuring an acceptable output voltage deviation. In addition, different target voltage levels may correspond to different sets of first, second and/or third ranges. The first, second and/or third ranges may be provided by an external source or hardwired or stored in the control circuit 130.

The first power converter 110 may be any type of direct current (DC) to DC converter. In some examples, the first power converter 110 may be a buck-boost converter, a boost converter, a buck converter, a flyback converter, an isolated DC to DC converter, a non-isolated DC to DC converter, or the like.

The second power converter 120 may be any type of DC to DC converter. In some examples, the second power converter 120 may be non-isolated DC to Dc converter, an isolated DC to DC converter, a full-bridge converter, a half-bridge converter, a dual-active-bridge converter, or the like. In at least on example, the second power converter 120 may include a resonant circuit, which further includes a transformer and a resonant network formed of one or more of inductive devices and capacitive devices.

In some examples, the first voltage detector 137 and the second voltage detector 138 can be implemented by hardware components. The first controller 132, the second controller 134, and the mode controller 136 may be implemented as an integrated controller or two or more separated controllers. Also, the first controller 132, the second controller 134, and the mode controller 136 may be implemented by hardware components, a processor executing program instructions, or a combination thereof.

In operation, the mode controller 136 can configure the first controller 132 and the second controller 134 in order to output the output voltage Vout at a target voltage level that is received from an external source or stored or hardwired in the control circuit 130. The first voltage detector 137 detects a voltage level of the input voltage Vin and forward the detected voltage level to the mode controller 136. The mode controller 136 can determine how to instruct the first controller 132 and/or the second controller 134 with respect to driving the first power converter 110 and the second power converter 120. In some examples, the mode controller 136 together with the first controller 132 and the second controller 134 performs an open-loop control of the first power converter 110 and a close-loop control of the second power converter 120 if the voltage level of the input voltage Vin is within a first range. In some examples, the mode controller 136 together with the first controller 132 and the second controller 134 performs a close-loop control of the first power converter 110 and an open-loop control of the second power converter 120 if the voltage level of the input voltage Vin is within a second range. In yet some other examples, the mode controller 136 together with the first controller 132 and the second controller 134 performs the close-loop control of the first power converter 110 and the close-loop control of the second power converter 120 if the voltage level of the input voltage Vin is within a third range.

In operation, based on the detected voltage level of the input voltage Vin, the first power converter 110 and the second power converter 120 are respectively controlled as described above. Specifically, the first power converter 110 can convert the input voltage Vin to the intermediate voltage Vm, while the second power converter 110 can convert the intermediate voltage Vm and/or the input voltage Vin to the output voltage Vout at the target voltage level. Also, according to the example as depicted in FIG. 1, the first controller 132 can perform the close-loop control of the first power converter 110 using the output voltage Vout as a feedback. Also, the second controller 134 can perform the close-loop control of the second power converter 120 using the output voltage Vout as a feedback.

Figure 2:
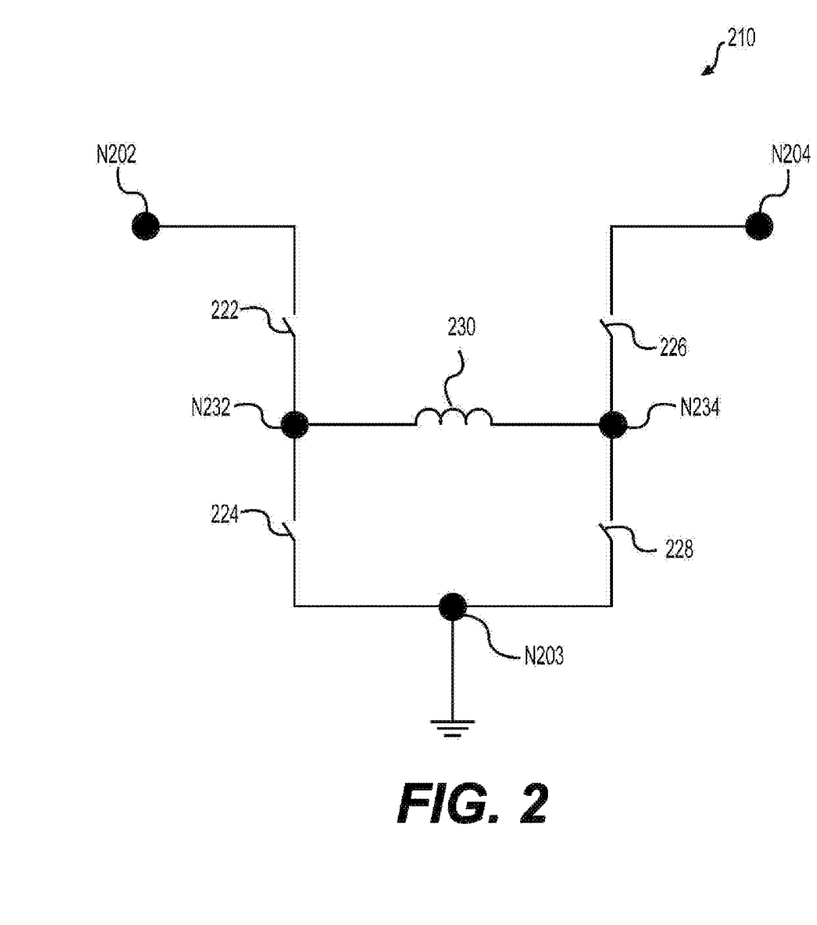
FIG. 2 shows a schematic diagram of an exemplary power converter that can be used as a first power converter in the voltage converting system of FIG. 1 according to an embodiment of the disclosure.

FIG. 2 shows a schematic diagram of an exemplary power converter 210 that can be used as a first power converter 110 in the voltage converting system 100 of FIG. 1 according to an embodiment of the disclosure. The power converter 210 is a buck-boost converter that includes a first power node N202, a reference node N203, and a second power node N204. The first power node N202 can correspond to the power node N102 and the second power node N204 can correspond to the power node N104 in FIG. 1. Also, the reference node N203 may be coupled to a reference ground and may correspond to the reference node N103 and/or the reference node N105 in FIG. 1.

The power converter 210 includes switches 222, 224, 226, and 228 and an inductive device 230. As shown, the switch 222 is coupled between node N202 and node N232; the switch 224 is coupled between node N203 and node N232. The switch 226 is coupled between node N204 and node N234; the switch 228 is coupled between node N203 and node N234. Also, the inductive device 230 is coupled between node N232 and node N234. In some examples, the switches 222-228 are transistors, such as N-type transistors, P-type transistors, field effect transistors, bipolar junction transistors, other types of transistors, or a combination thereof. In some examples, the switches 224 and/or the switch 226 are diodes or the like.

In operation, when power converter 210 operates under an open-loop control, the switches 222 and 226 may be turned on and the switches 224 and 228 may be turned off, such that the voltage received at node N202 would be passed to node N204 through the inductive device 230. When the power converter 210 operates under a close-loop control, the switches 222-228 may be selectively turned on or off such that in a first state the energy is transfer from a voltage at node N202 to the inductive device 230, and in a second state the energy is transfer from the inductive device 230 to node N204. By referencing to a feedback voltage that corresponds to the voltage at node N204, as well as a reference level of the feedback voltage, the frequency, phases, and/or duty cycles of the on/off status of the switches 222-228 may be controlled to keep the output voltage at node N204 within an accepted deviation from a target level.

Of course, in some examples, the power converter 210 can also be used as a second power converter 120 in the voltage converting system 100 of FIG. 1.

Figure 3A:
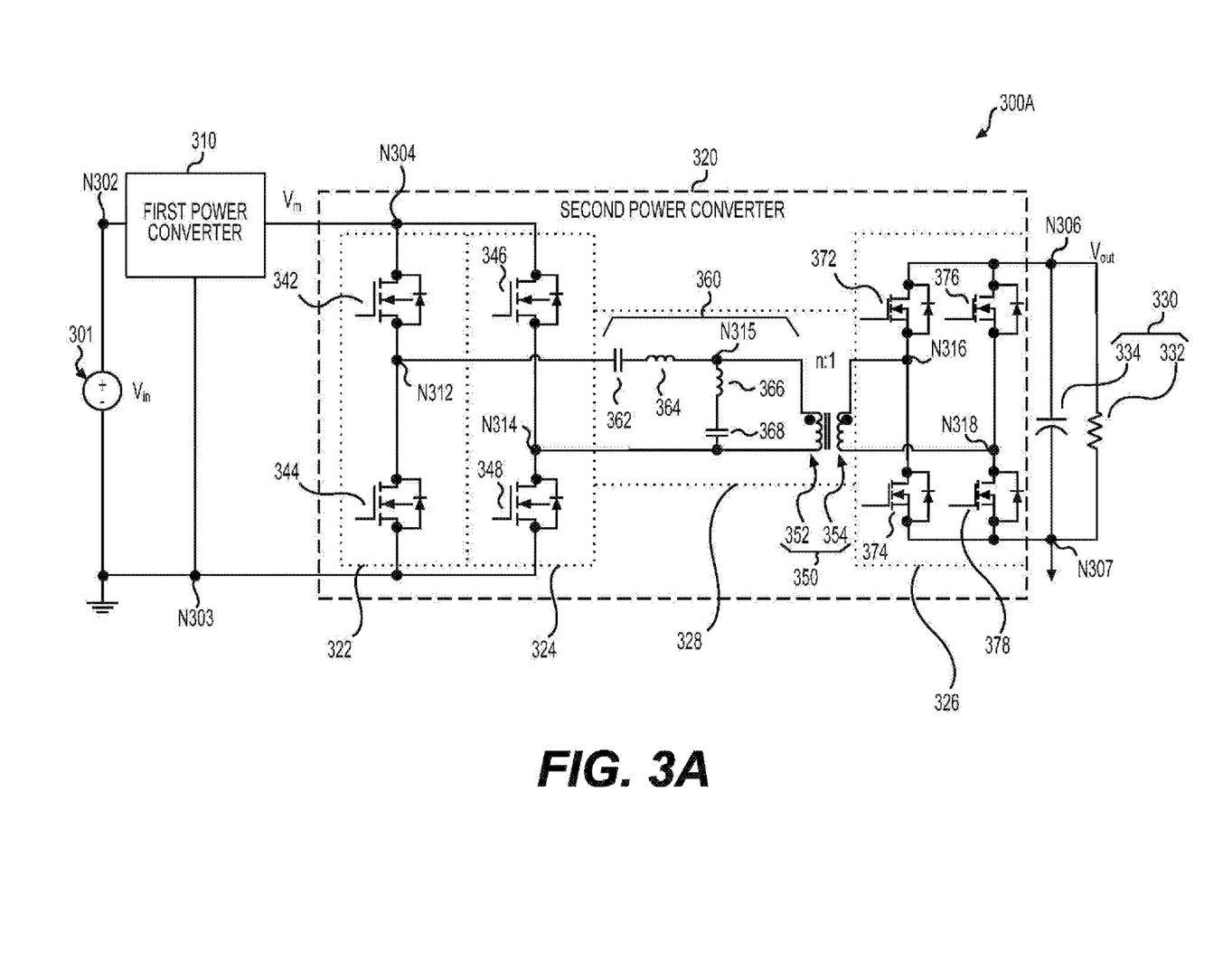
FIG. 3A shows a diagram of an exemplary voltage converting system according to an embodiment of the disclosure.

FIG. 3A shows a diagram of an exemplary voltage converting system 300A. The voltage converting system 300A includes a voltage source 301, a first power converter 310, and a second power converter 320. The control circuit for controlling the first power converter 310 and the second power converter 320 is not shown in FIG. 3A.

The voltage converting system 300A can include power nodes N302, N304, and N306 and reference nodes N303 and N307. Power nodes N302, N304, and N306 may correspond to power nodes N102, N104, and N106 in FIG. 1. Also, reference node N303 may correspond to reference node N103 and/or N105, and reference node N307 may correspond to reference node N107. The voltage source 301 can provide an input voltage Vin at power node N302 with reference to reference node N303. The first power converter 310 can convert the input voltage Vin to an intermediate voltage Vm at node N304. The second power converter 320 can convert the intermediate voltage Vm to an output voltage Vout at node N306 with reference to the reference node N307. The output voltage Vout can be used to drive a load system 330, which is represented by a load resistive system 332 and a load capacitive system 334 between nodes N306 and N307.

As shown, the second power converter 320 can include a first half-bridge leg 322, a second half-bridge leg 324, a full-bridge 326, and a resonant circuit 328. The first half-bridge leg 322 has an output node N312; the second half-bridge leg 324 has an output node N314; and the full bridge 326 has output nodes N316 and N318. The first half-bridge leg 322 and the second half-bridge leg 324 constitute a full-bridge inverter. The full bridge 326 can function as a rectifier. The resonant circuit 328 includes a transformer 350 and a resonant network 360. The transformer 350 has a primary side winding 352 electrically coupled between the output nodes N312 and N314, and a secondary side winding 354 electrically coupled between the output nodes N316 and N318. The resonant network 360 can include capacitive devices 362 and 368 and inductive devices 364 and 366. The capacitive device 362 and the inductive device 364 are coupled in series between node N312 and node N315; and the capacitive device 368 and the inductive device 366 are coupled in series between node N315 and node N314. In some examples, the capacitive device 368 is not required and can be replaced with a short-circuit path. Furthermore, when the capacitive device 368 is omitted, in some examples, the inductive device 366 can be integrated with the transformer winding 352 and/or 354 as magnetizing inductance.

In some examples, the resonant network 360 can be disposed at the secondary side of the transformer 350 instead of at the primary side of the transformer 350 as currently shown in FIG. 3A. In such example, the resonant network 360 can be coupled between nodes N316 and N318 with the secondary side winding 354.

The first half-bridge leg 322 includes a transistor 342 coupled between node N304 and node N312, and a transistor 344 coupled between node N312 and node N303. The second half-bridge leg 324 includes a transistor 346 coupled between node N304 and node N314, and a transistor 348 coupled between node N314 and node N303. The full-bridge 326 includes a transistor 372 coupled between node N306 and node N316, a transistor 374 coupled between node N316 and node N307, a transistor 376 coupled between node N306 and node N318, and a transistor 378 coupled between node N318 and node N307. In some examples, transistors 342-348 and 372-378 are N-type transistors that have respective intrinsic body diodes. In some examples, transistors 372/374/376/378 can be replaced with diodes or the like.

In operation, when the power converter 320 operates under a close-loop control, the transistors 342-348 may be selectively turned on or off such that the first half-bridge 322, the second half-bridge 324, and the resonant network can convert the intermediate voltage Vm to a primary side alternating current (AC) voltage at nodes N315 and N314. The transformer 350 may convert the primary side AC voltage to a secondary side AC voltage at nodes N316 and N318. Also, the transistors 372-378 may be selectively turned on or off such that the full-bridge 326 can convert the secondary side AC voltage at nodes N316 and N318 to the output voltage Vout. By referencing to a feedback voltage that corresponds to the voltage at node N304, as well as a reference level of the feedback voltage, the frequency, phases, and/or duty cycles of the on/off status of the transistors 342-348 and 372-378 may be controlled to keep the output voltage Vout at node N306 within an accepted deviation from a target level. Moreover, when the power converter 320 operates under an open-loop control, the transistors 342-348 and 372-378 may be turned on or off at a fixed frequency, phases, and/or duty cycles.

Of course, in some examples, the power converter 320 can also be used as a first power converter 110 in the voltage converting system 100 of FIG. 1.

Figure 3B:
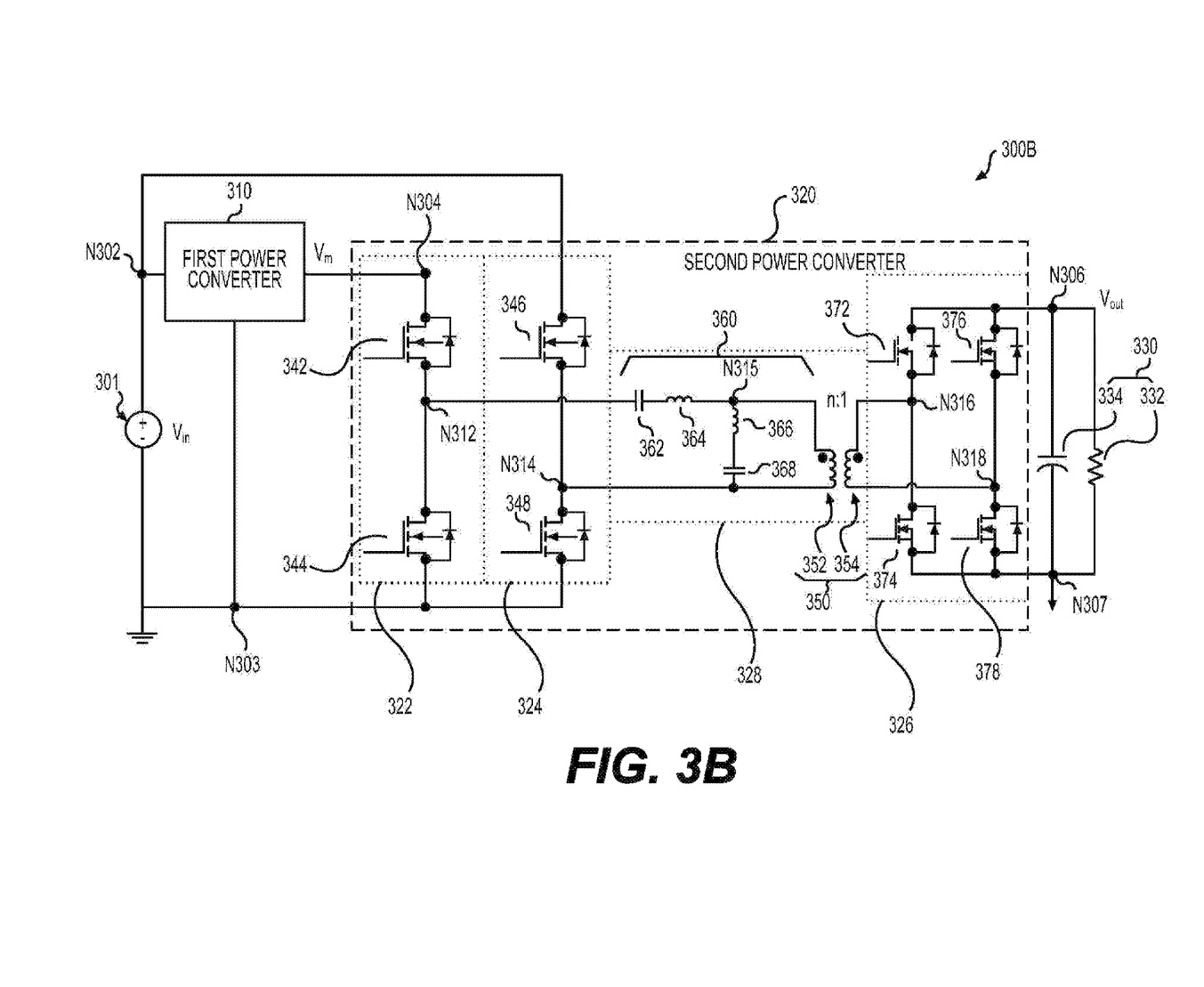
FIG. 3B shows a diagram of another exemplary voltage converting system where the second power converter thereof is configured to receive both an input voltage and an intermediate voltage from the first power converter according to an embodiment of the disclosure.

FIG. 3B shows a diagram of another exemplary voltage converting system 300B where the second power converter 320 thereof is configured to receive both an input voltage Vin and an intermediate voltage Vm from the first power converter 310 according to an embodiment of the disclosure. Components depicted in FIG. 3B that are the same or similar to the components in FIG. 3A are given the same reference numbers, and detailed description thereof is omitted.

Compared with the voltage converting system 300A, the second power converter 320 of the voltage converting system 300B receives both the input voltage Vin and the intermediate voltage Vm. For example, the first half-bridge leg 322 is coupled between node N304 and node N303 and thus is configured to receive the intermediate voltage Vm at node N304; and the second half-bridge leg 324 is coupled between node N302 and node N303 and thus is configured to receive the input voltage Vin at node N302.

In operation, the voltage converting system 300B on the primary side of the resonant circuit 328 receives the intermediate voltage Vm through the first half-bridge leg 322 and receives the input voltage Vin through the second half-bridge leg 324. As such, a portion of the total input energy (e.g., provided by the input voltage Vin) is transmitted to the primary side of the resonant circuit 328 without passing through the first power converter 310. Therefore, the voltage converting system 300B may achieve a better power conversion efficiency than the voltage converting system 300A. In some examples, the power converter 320 of the voltage converting system 300B can still operation in a manner similar to the operation of the power converter 320 of the voltage converting system 300A as described with reference to FIG. 3A.

In some examples, the resonant network 360 in the power converter 320 of the voltage converting system 300B can also be disposed at the secondary side of the transformer 350 instead of at the primary side of the transformer 350 as currently shown in FIG. 3B. In such example, the resonant network 360 can be coupled between nodes N316 and N318 with the secondary side winding 354.

Figure 4:
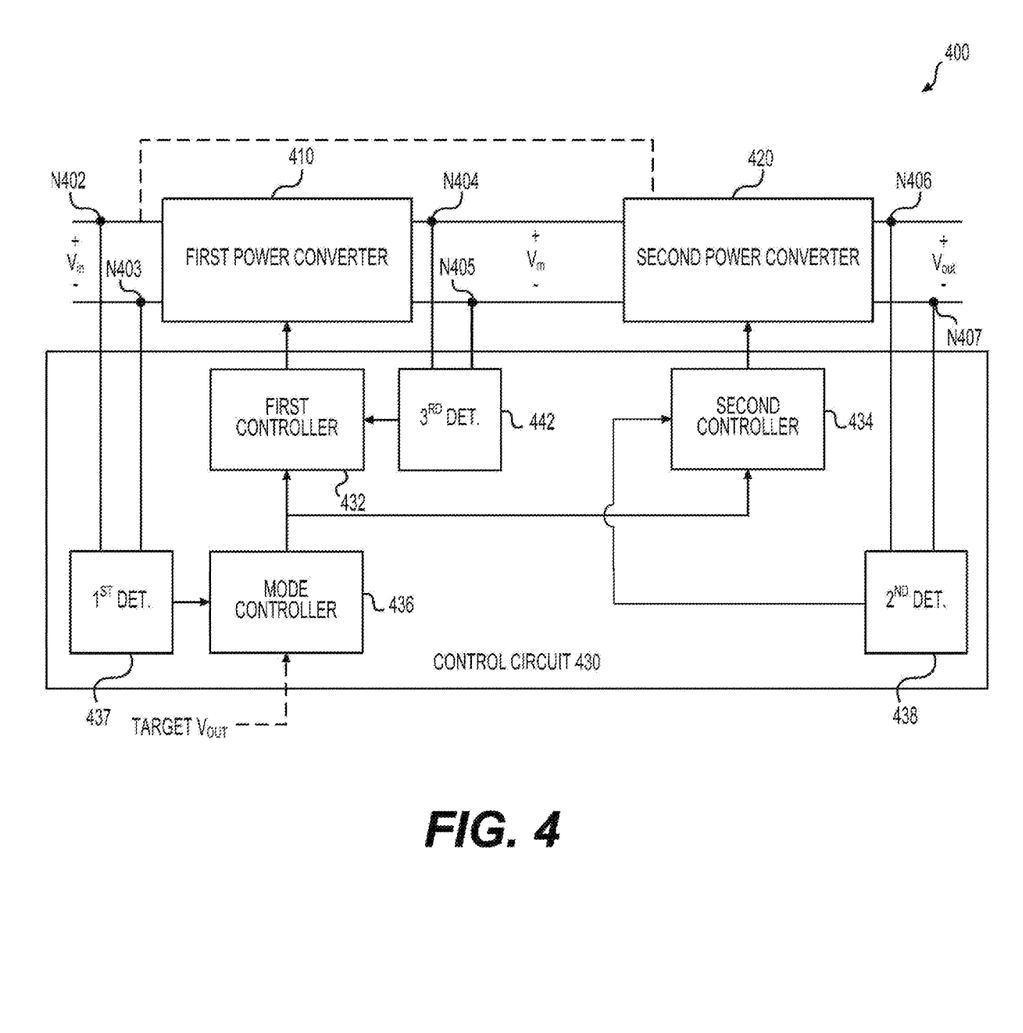
FIG. 4 shows a functional block diagram of another exemplary voltage converting system according to an embodiment of the disclosure.

FIG. 4 shows a functional block diagram of another exemplary voltage converting system 400 that can receive an input voltage Vin and output an output voltage Vout at a target voltage level. As shown, the voltage converting system 400 can include a first power converter 410, a second power converter 420, and control circuit 430, which corresponds to the first power converter 110, the second power converter 120, and the control circuit 130 in FIG. 1, respectively.

The first power converter 410 receives the input voltage Vin at a power node N402 with respect to a reference node N403. The first power converter 410 also outputs an intermediate voltage Vm at a power node N404 with respect to a reference node N405. Moreover, the second power converter 420 receives the intermediate voltage Vm at the power node N404 with respect to the reference node N405. The second power converter 420 also outputs the output voltage Vout at a power node N406 with respect to a reference node N407. In some examples, the second power converter 420 may also receive the input voltage Vin and generate the output voltage Vout by converting both the input voltage Vin and the intermediate voltage Vm.

The control circuit 430 can include a first controller 432, a second controller 434, a mode controller 436, a first voltage detector 437, and a second voltage detector 438. The control circuit 430 further includes a third voltage detector 442. The third voltage detector 442 is coupled with nodes N404 and N405 and can determine a voltage level of the intermediate voltage Vm. Compared with the first controller 132 in FIG. 1, the first controller 432 in FIG. 4 can perform the close-loop control of the first power converter 410 using the detected voltage level of the intermediate voltage Vm from the third voltage detector 442 as a feedback. A target voltage level of the intermediate voltage Vm may be determined by the mode controller 436 or set according to a predetermined value received from an external source, or hardwired or stored in the control circuit 430. Otherwise, in some examples, the voltage converting system 400 can operate in a similar manner to the operation of the voltage converting system 100, as described with reference to FIG. 1.

Figure 5:
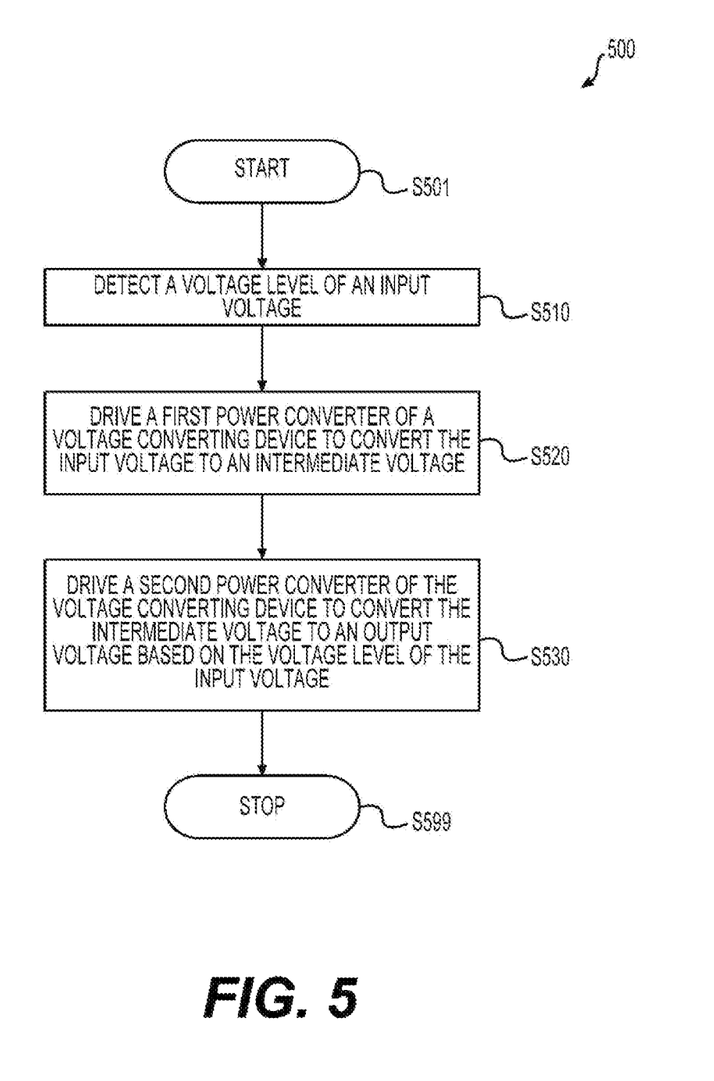
FIG. 5 shows a flowchart of an exemplary process of receiving an input voltage and outputting an output voltage at a target voltage level by using a voltage converting system according to an embodiment of the disclosure.

FIG. 5 shows a flowchart of an exemplary process 500 of receiving an input voltage and outputting an output voltage at a target voltage level by using a voltage converting system according to an embodiment of the disclosure. In some examples, the process 500 can be performed by the voltage converting system 100 in FIG. 1 or the voltage converting system 400 in FIG. 4 with the first power converter 210 in FIG. 2 and/or the second power converter 320 in FIG. 3A or FIG. 3B. It is understood that additional operations may be performed before, during, and/or after the process 500 depicted in FIG. 5. The process 500 starts at S501 and proceeds to S510.

At S510, a voltage level of the input voltage is detected. The voltage level of the input voltage Vin can be used to determine how to drive a first power converter and/or a second power converter of the voltage converting system for outputting the output voltage at the target voltage level. For example, the first voltage detector 137 can detect a voltage level of the input voltage Vin in a manner described with reference to FIG. 1.

At S520, the first power converter of the voltage converting system is driven to convert the input voltage to an intermediate voltage. For example, as shown in FIG. 1, the first controller 132 can drive the first power converter 110 to convert the input voltage Vin to an intermediate voltage Vm in a manner described with reference to FIG. 1. Exemplary implementations with respect to S520 are further described with reference to FIGS. 7 and 8.

In some examples, as instructed by the mode controller 136, the first controller 132 can perform either a close-loop control or an open-loop control of the first power converter 110. The open-loop control of the first power converter 110 may increase the power conversion efficiency of the first power converter 110 but also increase the voltage deviation of the intermediate voltage Vm from a target value thereof. On the other hand, the close-loop control of the first power converter 110 may decrease the power conversion efficiency of the first power converter 110 as well as the voltage deviation of the intermediate voltage Vm from the target value. In some examples, the control circuit 130, or the mode controller 136, may instruct the first controller 132 to perform either a close-loop control or an open-loop control of the first power converter 110 based on the detected voltage level of the input voltage Vin under a given target voltage level of the output voltage Vout.

At S530, the second power converter of the voltage converting system is driven to convert the intermediate voltage and/or the input voltage to the output voltage based on the detected voltage level of the input voltage. For example, as shown in FIG. 1, the second controller 134 can drive the second power converter 120 to convert the intermediate voltage Vm and/or the input voltage Vin to the output voltage Vout in a manner described with reference to FIG. 1. Exemplary implementations with respect to S530 are further described with reference to FIGS. 6, 7, and 8.

In some examples, as instructed by the mode controller 136, the second controller 134 can perform either a close-loop control or an open-loop control of the second power converter 120. The open-loop control of the second power converter 120 may increase the power conversion efficiency of the second power converter 120 but also increase the voltage deviation of the output voltage Vout from the target voltage level thereof. On the other hand, the close-loop control of the second power converter 120 may decrease the power conversion efficiency of the second power converter 120 as well as the voltage deviation of the output voltage Vout from the target voltage level thereof. In some examples, the control circuit 130, or the mode controller 136, may instruct the second controller 134 to perform either a close-loop control or an open-loop control of the second power converter 120 based on the detected voltage level of the input voltage Vin under a given target voltage level of the output voltage Vout.

In one example, the mode controller 136 may instruct the second controller 134 to perform the close-loop control of the second power converter 120 if the detected voltage level of the input voltage Vin is within a first range, and to perform the open-loop control of the second power converter 120 if the detected voltage level of the input voltage Vin is within a second range, which is outside the first range. In another example, the mode controller 136 may instruct the second controller 134 to perform the close-loop control of the second power converter 120 if the detected voltage level of the input voltage Vin is within a third range. In some examples, the third range includes two subsets that are greater or smaller than the first range, respectively, and the second range includes two subsets that are greater or smaller than the third range, respectively. In some examples, the second range includes two subsets that are greater or smaller than the first range, respectively.

After S530, the process proceeds to S599 and terminates.

Figure 6:
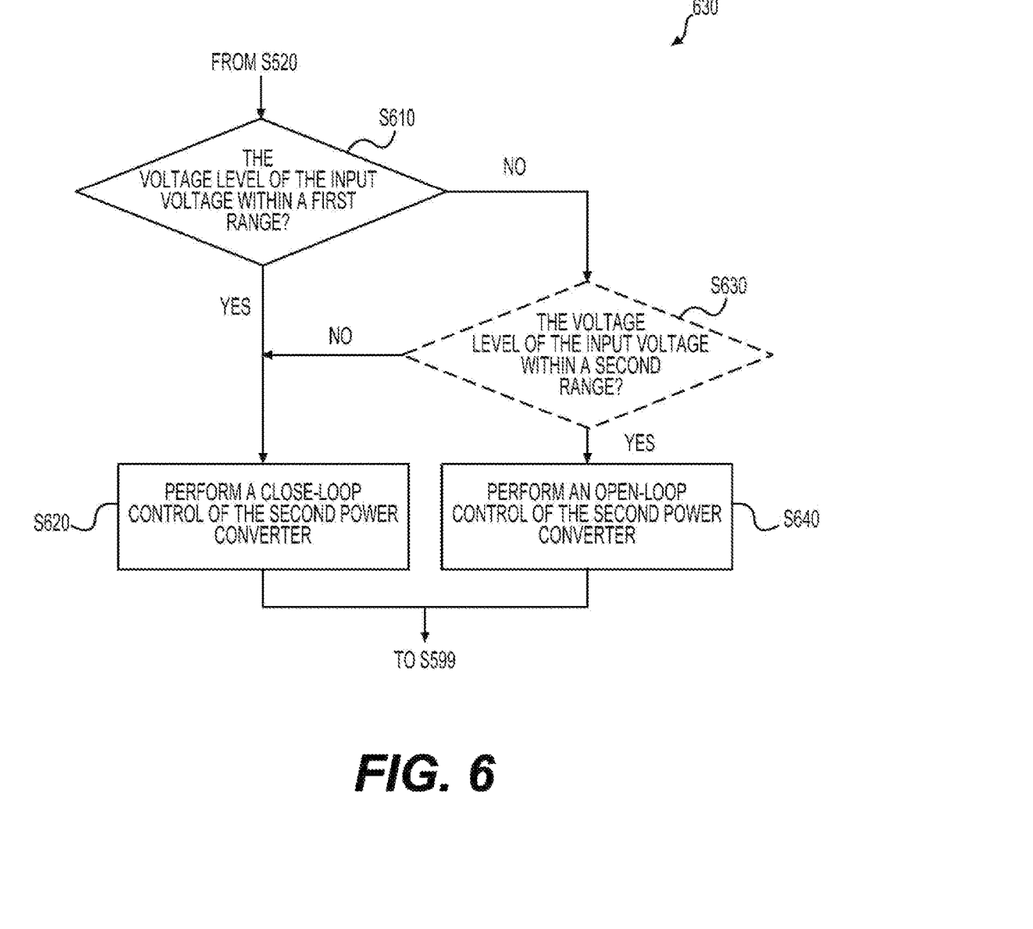
FIG. 6 shows a flowchart of an exemplary process of driving the second power converter of the voltage converting system in FIG. 5 according to an embodiment of the disclosure.

FIG. 6 shows a flowchart of an exemplary process 630 of driving the second power converter of the voltage converting system in FIG. 5 according to an embodiment of the disclosure. It is understood that additional operations may be performed before, during, and/or after the process 630 depicted in FIG. 6. The process 630 corresponds to S530 in FIG. 5 and proceeds to S610 after S520.

At S610, it is determined whether the detected voltage level of the input voltage is within a first range. If the detected voltage level of the input voltage is within the first range, the process proceeds to S620. If the detected voltage level of the input voltage is not within the first range, the process proceeds to S630 or S640. For example, the control circuit 130 or 430, in particular the mode controller 136 or 436, can determine whether the detected voltage level of the input voltage Vin is within the first range. In some examples, the first range is set in associated with a target voltage level of the output voltage Vout. The first range can be provided from an external source or stored or hardwired in the control circuit 130 or 430.

At S620, a close-loop control of the second power converter is performed if the detected voltage level of the input voltage is within the first range. For example, the mode controller 136 or 436 can instruct the second controller 134 or 434 to perform the close-loop control of the second power converter 120, 320, or 420 in a manner as described with reference to FIGS. 1, 3A, 3B, and 4.

At S630, it is further determined whether the detected voltage level of the input voltage is within a second range that is different from the first range. If the detected voltage level of the input voltage is within the second range, the process proceeds to S640. If the detected voltage level of the input voltage is not within the second range, the process proceeds to S620. For example, the control circuit 130 or 430, in particular the mode controller 136 or 436, can determine whether the detected voltage level of the input voltage Vin is within the second range. In some examples, the second range is also set in associated with the target voltage level of the output voltage Vout. The second range can also be provided from an external source or stored or hardwired in the control circuit 130 or 430.

In at least some examples, S630 may be omitted if the second range is defined as any voltage level outside the first range, and the process proceeds to S640 from S640 if the detected voltage level of the input voltage is not within the first range.

At S640, an open-loop control of the second power converter is performed if the detected voltage level of the input voltage is within the second range. For example, the mode controller 136 or 436 can instruct the second controller 134 or 434 to perform the open-loop control of the second power converter 120, 320, or 420 in a manner as described with reference to FIGS. 1, 3A, 3B, and 4.

After S620 or S640, the process proceeds to S599 in FIG. 5.

Figure 7:
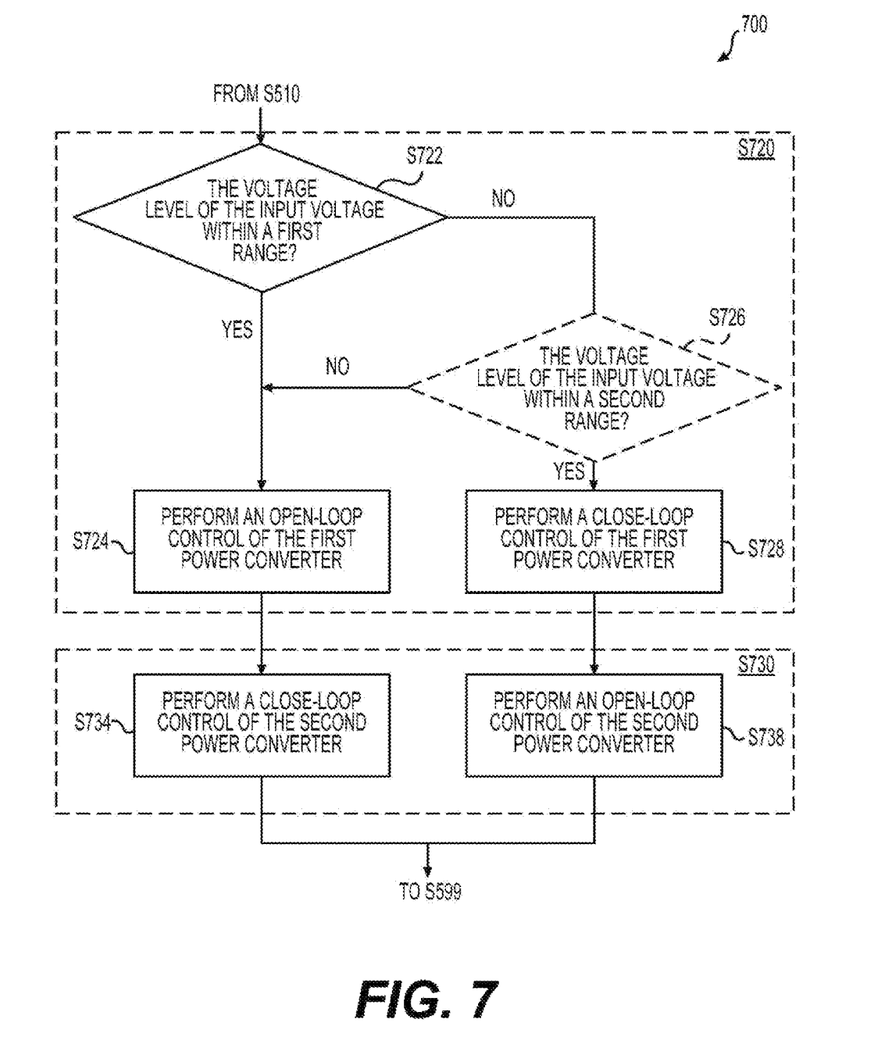
FIG. 7 shows a flowchart of an exemplary process of driving the first power converter and the second power converter of the voltage converting system in FIG. 5 according to an embodiment of the disclosure.

FIG. 7 shows a flowchart of an exemplary process 700 of driving the first power converter and the second power converter of the voltage converting system in FIG. 5 according to an embodiment of the disclosure. It is understood that additional operations may be performed before, during, and/or after the process 700 depicted in FIG. 7. The process 700 includes S722-S728 (collectively identified as S720) that correspond to S520 in FIG. 5, and S734 and S738 (collectively identified as S730) that that correspond to S530 in FIG. 5. The process 700 proceeds to S722 after S510.

At S722, it is determined whether the detected voltage level of the input voltage is within a first range. If the detected voltage level of the input voltage is within the first range, the process proceeds to S724. If the detected voltage level of the input voltage is not within the first range, the process proceeds to S726 or S728. For example, the control circuit 130 or 430, in particular the mode controller 136 or 436, can determine whether the detected voltage level of the input voltage Vin is within the first range. In some examples, the first range is set in associated with a target voltage level of the output voltage Vout. The first range can be provided from an external source or stored or hardwired in the control circuit 130 or 430.

At S724, an open-loop control of the first power converter is performed if the detected voltage level of the input voltage is within the first range. For example, the mode controller 136 or 436 can instruct the first controller 132 or 432 to perform the open-loop control of the first power converter 110, 210, or 410 in a manner as described with reference to FIGS. 1, 2, and 4. After S724, the process proceeds to S734.

At S734, a close-loop control of the second power converter is performed if the detected voltage level of the input voltage is within the first range. For example, the mode controller 136 or 436 can instruct the second controller 134 or 434 to perform the close-loop control of the second power converter 120, 320, or 420 in a manner as described with reference to FIGS. 1, 3A, 3B, and 4.

On the other hand, at S726, it is further determined whether the detected voltage level of the input voltage is within a second range that is different from the first range. If the detected voltage level of the input voltage is within the second range, the process proceeds to S728. If the detected voltage level of the input voltage is not within the second range, the process proceeds to S724. For example, the control circuit 130 or 430, in particular the mode controller 136 or 436, can determine whether the detected voltage level of the input voltage Vin is within the second range. In some examples, the second range is also set in associated with the target voltage level of the output voltage Vout. The second range can also be provided from an external source or stored or hardwired in the control circuit 130 or 430.

In at least some examples, S726 may be omitted if the second range is defined as any voltage level outside the first range, and the process proceeds to S728 from S722 if the detected voltage level of the input voltage is not within the first range.

At S728, a close-loop control of the first power converter is performed if the detected voltage level of the input voltage is within the second range. For example, the mode controller 136 or 436 can instruct the first controller 132 or 432 to perform the close-loop control of the second power converter 110, 210, or 410 in a manner as described with reference to FIGS. 1, 2, and 4. After S728, the process proceeds to S738.

At S738, an open-loop control of the second power converter is performed if the detected voltage level of the input voltage is within the second range. For example, the mode controller 136 or 436 can instruct the second controller 134 or 434 to perform the open-loop control of the second power converter 120, 320, or 420 in a manner as described with reference to FIGS. 1, 3A, 3B, and 4.

After S734 or S738, the process proceeds to S599 in FIG. 5.

Figure 8:
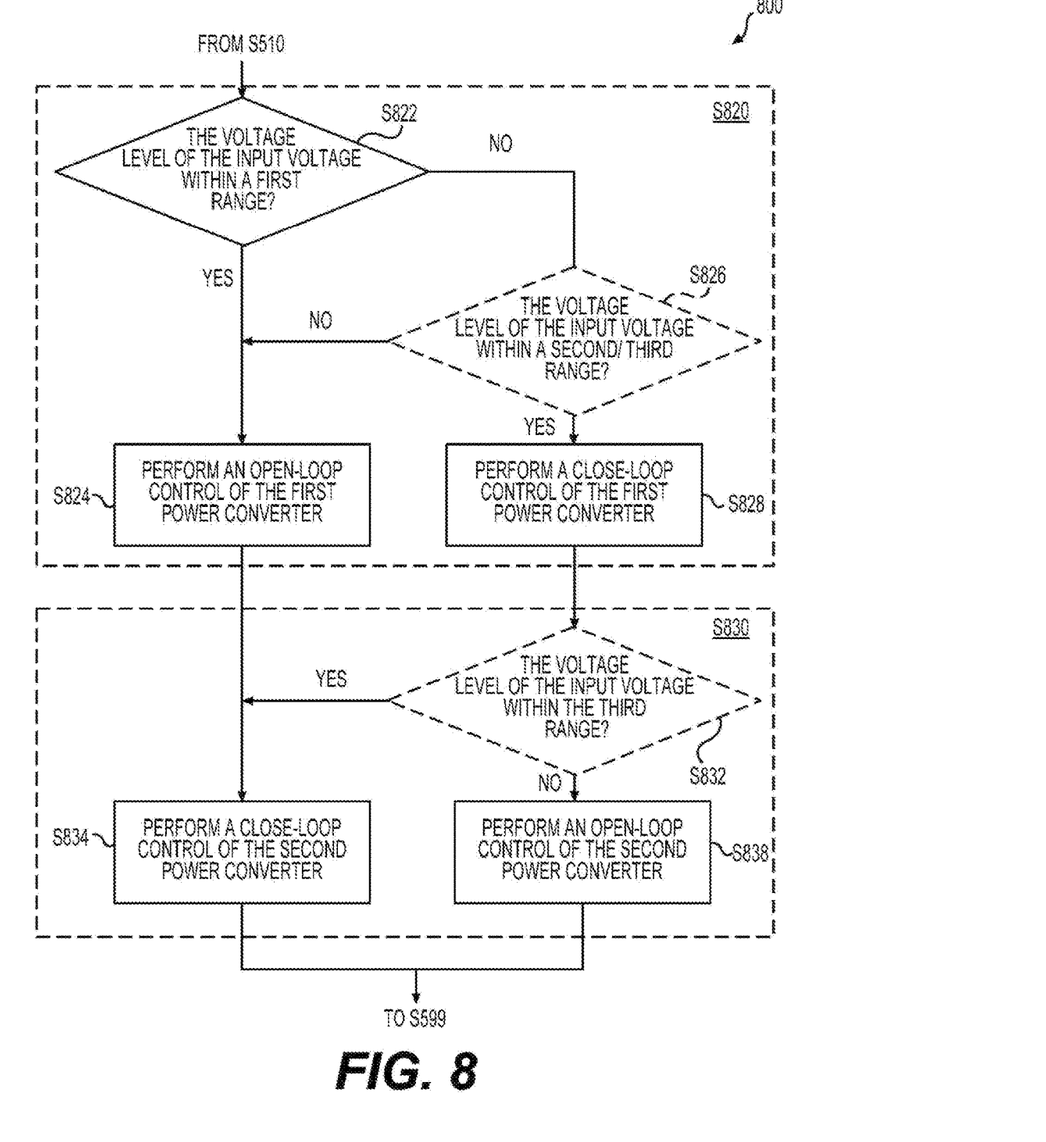
FIG. 8 shows a flowchart of another exemplary process of driving the first power converter and the second power converter of the voltage converting system in FIG. 5 according to an embodiment of the disclosure.

FIG. 8 shows a flowchart of another exemplary process 800 of driving the first power converter and the second power converter of the voltage converting system in FIG. 5 according to an embodiment of the disclosure. It is understood that additional operations may be performed before, during, and/or after the process 800 depicted in FIG. 8. The process 800 includes S822-S828 (collectively identified as S820) that correspond to S520 in FIG. 5, and S832-S838 (collectively identified as S830) that that correspond to S530 in FIG. 5. The process 800 proceeds to S822 after S510.

At S822, it is determined whether the detected voltage level of the input voltage is within a first range in a manner similar to S722 in FIG. 7. If the detected voltage level of the input voltage is within the first range, the process proceeds to S824. If the detected voltage level of the input voltage is not within the first range, the process proceeds to S826 or S828. For example, the control circuit 130 or 430, in particular the mode controller 136 or 436, can perform S822 in manner as described with reference to FIGS. 1, 4, and 7.

At S824, an open-loop control of the first power converter is performed if the detected voltage level of the input voltage is within the first range in a manner similar to S724 in FIG. 7. For example, the mode controller 136 or 436 can instruct the first controller 132 or 432 to perform the open-loop control of the first power converter 110, 210, or 410 in a manner as described with reference to FIGS. 1, 2, and 4. After S824, the process proceeds to S834.

At S834, a close-loop control of the second power converter is performed if the detected voltage level of the input voltage is within the first range in a manner similar to S734 in FIG. 7. For example, the mode controller 136 or 436 can instruct the second controller 134 or 434 to perform the close-loop control of the second power converter 120, 320, or 420 in a manner as described with reference to FIGS. 1, 3A, 3B, and 4.

On the other hand, at S826, it is further determined whether the detected voltage level of the input voltage is within a second range or a third range different from the first range. If the detected voltage level of the input voltage is within the second range or the third range, the process proceeds to S828. If the detected voltage level of the input voltage is not within the second range or the third range, the process proceeds to S824. For example, the control circuit 130 or 430, in particular the mode controller 136 or 436, can determine whether the detected voltage level of the input voltage Vin is within the second range or the third range. In some examples, the second range and the third range are set in associated with the target voltage level of the output voltage Vout. The second range and/or the third range can also be provided from an external source or stored or hardwired in the control circuit 130 or 430.

In at least some examples, S826 may be omitted if the second range and the third range together are defined as any voltage level outside the first range, and the process proceeds to S828 from S822 if the detected voltage level of the input voltage is not within the first range.

At S828, a close-loop control of the first power converter is performed if the detected voltage level of the input voltage is within the second range or the third range. For example, the mode controller 136 or 436 can instruct the first controller 132 or 432 to perform the close-loop control of the second power converter 110, 210, or 410 in a manner as described with reference to FIGS. 1, 2, and 4. After S828, the process proceeds to S832.

At S832, it is further determined whether the detected voltage level of the input voltage is within the third range. If the detected voltage level of the input voltage is within the third range, the process proceeds to S834. If the detected voltage level of the input voltage is not within the third range, which means the detected voltage level is within the second range, the process proceeds to S838. For example, the control circuit 130 or 430, in particular the mode controller 136 or 436, can determine whether the detected voltage level of the input voltage Vin is within the third range. In at least some examples, the S832 and S826 may be performed in an integrated manner at S826, and the process 800 is only directed to suitable branches at S832 based on the determination results from S826.

At S838, an open-loop control of the second power converter is performed if the detected voltage level of the input voltage is within the second range but not the third range. For example, the mode controller 136 or 436 can instruct the second controller 134 or 434 to perform the open-loop control of the second power converter 120, 320, or 420 in a manner as described with reference to FIGS. 1, 3A, 3B, and 4.

After S834 or S838, the process proceeds to S599 in FIG. 5.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate, preclude or suggest that a combination of these measures cannot be used to advantage. A computer program may be stored or distributed on a suitable medium, such as an optical storage medium or a solid-state medium supplied together with, or as part of, other hardware, but may also be distributed in other forms, such as via the Internet or other wired or wireless telecommunication systems.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A voltage converting system, comprising:
   a first power converter configured to convert an input voltage to an intermediate voltage, wherein the first power converter is a buck-boost converter;
   a second power converter configured to convert the intermediate voltage to an output voltage at a target voltage level, wherein the second power converter is an isolated direct current (DC) to DC converter; and
   a control circuit coupled to the first power converter and the second power converter that is configured to: perform a first close-loop control on the first power converter and a second open-loop control on the second power converter when the input voltage is over a first threshold or below a second threshold, and perform a first open-loop control on the first power converter and a second close-loop control on the second power converter when the input voltage is between the second threshold and the first threshold, wherein the first threshold is higher than the second threshold, and wherein under the first open-loop control, the input voltage applied to the first power converter is passed to an output node of the first power converter through an inductive device.

2. The voltage converting system according to claim 1, wherein the control circuit is configured to perform the first close-loop control of the first power converter using the output voltage as a feedback.

3. The voltage converting system according to claim 1, wherein the control circuit is configured to perform the first close-loop control of the first power converter using the intermediate voltage as a feedback.

4. The voltage converting system according to claim 1, wherein
   the second power converter includes an inverter, a rectifier, and a transformer between the inverter and the rectifier.

5. The voltage converting system according to claim 4, wherein
   the inverter of the second power converter comprises:
   a first half-bridge leg having a first power node configured to receive the intermediate voltage from the first power converter; and
   a second half-bridge leg having a second power node configured to receive the intermediate voltage from the first power converter, and
   the transformer of the second power converter comprises a primary side electrically coupled between output nodes of the first half-bridge leg and the second half-bridge leg.

6. The voltage converting system according to claim 4, wherein
   the inverter of the second power converter comprises:
   a first half-bridge leg having a first power node configured to receive the intermediate voltage from the first power converter; and
   a second half-bridge leg having a second power node configured to receive the input voltage, and
   the transformer of the second power converter comprises a primary side electrically coupled between output nodes of the first half-bridge leg and the second half-bridge leg.

7. The voltage converting system according to claim 1, wherein
   the first power converter, under the first close-loop control, is configured to receive the input voltage within a first dynamic range, the second power converter, under the second close-loop control, is configured to receive the intermediate voltage within a second dynamic range, and the second dynamic range is greater than the first dynamic range.

8. A method, comprising:

driving a first power converter of a voltage converting system to convert an input voltage to an intermediate voltage, wherein the first power converter is a buck-boost converter; and driving a second power converter of the voltage converting system to convert the intermediate voltage to an output voltage at a target voltage level based on a voltage level of the input voltage, including:

performing a first close-loop control on the first power converter and a second open-loop control on the second power converter when the input voltage is over a first threshold or below a second threshold, and performing a first open-loop control on the first power converter and a second close-loop control on the second power converter when the input voltage is between the second threshold and the first threshold, wherein the first threshold is higher than the second threshold, wherein under the first open-loop control, the input voltage applied to the first power converter is passed to an output node of the first power converter through an inductive device, wherein the second power converter is an isolated converter.

9. The method according to claim 8, wherein the performing the first close-loop control on the first power converter comprises using the output voltage as a feedback.

10. The method according to claim 8, wherein the performing the first close-loop control on the first power converter comprises using the intermediate voltage as a feedback.

* * * * *